(12) United States Patent
Ando et al.

(10) Patent No.: US 6,624,260 B2
(45) Date of Patent: Sep. 23, 2003

(54) RUBBER-MODIFIED EPOXY RESIN COMPOSITION

(75) Inventors: Katsuhiro Ando, Hyogo (JP); Junji Takase, Hyogo (JP); Fumio Kawakubo, Hyogo (JP)

(73) Assignee: Kaneka Corporation, Osaka (JP)

( * ) Notice: Subject to any disclaimer, the term of this patent is extended or adjusted under 35 U.S.C. 154(b) by 40 days.

(21) Appl. No.: 09/834,107

(22) Filed: Apr. 13, 2001

(65) Prior Publication Data

US 2002/0016411 A1 Feb. 7, 2002

(30) Foreign Application Priority Data

Sep. 8, 2000 (JP) ........................................ 2000-273303
Apr. 14, 2000 (JP) ........................................ 2000-113142

(51) Int. Cl.$^7$ .............................................. C08L 83/16
(52) U.S. Cl. ........................ 525/476; 525/100; 525/101; 525/119; 525/393; 525/403
(58) Field of Search ............................ 528/35, 87, 93, 528/103, 406, 408, 403, 901; 525/100, 393, 403, 476, 101, 119

(56) References Cited

U.S. PATENT DOCUMENTS

| | | | |
|---|---|---|---|
| 4,657,986 A | | 4/1987 | Isayama et al. |
| 4,981,728 A | * | 1/1991 | Homma et al. ............. 427/386 |
| 5,650,467 A | | 7/1997 | Suzuki et al. |

FOREIGN PATENT DOCUMENTS

| EP | 370464 A2 | * | 11/1989 | ......... C08L/101/10 |
|---|---|---|---|---|
| EP | 370464 A2 | * | 5/1990 | |
| EP | 0 476 150 A1 | | 3/1992 | |
| EP | 0 671 437 A1 | | 9/1995 | |
| EP | 0 676 448 A1 | | 10/1995 | |
| EP | 0 697 439 A2 | | 2/1996 | |
| JP | 06057208 A | * | 3/1994 | |

OTHER PUBLICATIONS

Guo Qipeng et al., "Phase Separation During Crosslinking of Epoxy Resin/Polly (ethylene oxide) Blends", Polymer Bulletin, Springer Verlag. Heidelberg, De, vol. 21, No. 6, Jun. 1, 1989, pp. 593–598.

Lee, S.H., et al. "Synthesis and photodegradation on poly [1,4–bis(dimethylsily)naphthalene]", Polymer Bulletin, vol. 22 (1989), pp. 355–362.

Iwahara, T., "Synthesis and Properties of Ethynylene–Disilanylene Copolymers", Macromolecules, vol. 23 (1990), pp. 1298–1301.

Ishikawa, M., et al. "Synthesis of poly[(disilanylene)diethynylene] with highly conducting properties", Journal of Organometallic Chemistry, vol. 381 (1990), pp. C57–C59.

Ijadi–Maghsoodi, S., et al. "Synthesis and Study of Silylene–Diacetylene Polymers", Macromolecules, vol. 23 (1990), pp. 4485–4486.

Shiina, K. "The First Successful Ring Opening Polymerization at the Si–Si–Bond: A Novel o–(Disilanylene)phenylene Polymer", Journal of Organometallic Chemistry, vol. 310 (1986), pp. C57–C59.

Ishikawa, M., et al. "Polymeric Organosilicon Systems. 7. Ring–Opening Polymerization of 1,2,5,6–Tetrasilacycloocta–3,7–diynes", Organometallics, vol. 8 (1989), pp. 2741–2742.

Shiina, K., et al. "Thermal Rearrangement of Hexamethyldisilane to Trimethyl(dimethylsilymethyl)–silane", Journal of Organic Chemistry, vol. 23 (1958), p. 139.

Sakurai, H., "Thermolysis of Hexamethyldisilane", Chemical Communications (1968), p. 930.

Ishikawa, M., et al. "Photolysis of Polymeric Organosilicon Systems. 4. Photochemical Behavior of Poly[p–(disilanylene)phenylene]", Organometallics, vol. 6 (1987), pp. 1673–1679.

* cited by examiner

Primary Examiner—Robert Dawson
Assistant Examiner—Marc S Zimmer
(74) Attorney, Agent, or Firm—Armstrong, Westerman & Hattori, LLP

(57) ABSTRACT

By using a curable composition comprising, (A) per 100 parts by weight of an epoxy resin, (B) from 1 to 50 parts by weight of a reactive silicon group-containing polyoxyalkylene polymer, and (C) from 1 to 90 parts by weight of a curing agent for epoxy resins, the working properties of an existing rubber-modified epoxy resin are improved to thereby give stable adhesion properties (for example, improved peel strength) without worsening the shear strength.

14 Claims, No Drawings

RUBBER-MODIFIED EPOXY RESIN COMPOSITION

FIELD OF THE INVENTION

This invention relates to a rubber-modified epoxy resin composition which can be easily handled before curing due to the low viscosity thereof and has an elevated peel strength without worsening the shear strength of the epoxy resin. This composition is sufficiently curable even at a relatively low temperature and achieves an excellent shear strength and peel strength.

DESCRIPTION OF THE RELATED ART

Owing to the excellent mechanical characteristics, electrical characteristics, heat resistance and adhesiveness, epoxy resins have been widely employed in, for example, casting compounds, laminates, sealing compounds, adhesives, coatings, maintenances for concrete and various composite materials. However, cured matters thus obtained are hard and brittle and thus suffer from a problem that only a poor peel strength can be achieved when employed as an adhesive.

To overcome the problem of the brittleness of cured epoxy resins, attempts have been made to modify these resins with the use of liquid carboxyl-terminal acrylonitrile-butadiene copolymers (CTBN) and thus an improvement in the peel strength is successfully achieved while sustaining a high shear strength. In the CTBN-modification method, however, phase separation is performed in the step of curing. Therefore, the dispersion state and the acrylonitrile-butadiene copolymer (NBR) phase size are frequently changed depending on the curing agent and curing conditions employed, which makes it difficult to achieve stable physical properties.

JP-A-6-107908 proposes a method wherein crosslinked NBR has been preliminarily dispersed in an uncured epoxy resin so as to prevent changes in the physical properties depending on the curing conditions (the term "JP-A" as used herein means an "unexamined published Japanese patent application"). Although the scattering of the physical properties can be overcome by this method, there still remains a problem that the epoxy resin has a high viscosity before curing and thus the working properties are seriously damaged.

SUMMARY OF THE INVENTION

An object of the invention is to improve the working properties of such a rubber-modified epoxy resin to thereby give stable adhesion properties (for example, improved peel strength) without worsening the shear strength.

To solve these problems, the inventors have conducted intensive studies. As a result, they have developed a curable composition based on an epoxy resin comprising a reactive silicon group-containing polyoxyalkylene polymer, optionally together with a copolymer having a molecular chain comprising (preferably substantially consisting of) one or more alkyl acrylate monomer units and/or alkyl methacrylate monomer units, and a specific curing agent for epoxy resins at a specific ratio, thereby completing the invention.

According to the first aspect, the invention relates to a curable composition comprising, per 100 parts by weight of an epoxy resin which is the component (A), from 1 to 50 parts by weight of a reactive silicon group-containing polyoxyalkylene polymer which is a component (B), and from 1 to 90 parts by weight of a curing agent for epoxy resins, which is a component (C), capable of compatibilizing the mixture of the component (A) and the component (B) at room temperature.

Note that throughout this specification, components D and Da are referred to as copolymers; however, it should be understood that components D and Da may be either a homopolymer or a copolymer.

In a preferable embodiment, the invention relates to a curable composition comprising, per 100 parts by weight of an epoxy resin which is the component (A)a, from 1 to 50 parts by weight of a reactive silicon group-containing polyoxyalkylene polymer which is a component (B), from 1 to 50 parts by weight of a copolymer, which is a component (D), having a molecular chain comprising (preferably substantially consisting of) one or more alkyl acrylate monomer units and/or alkyl methacrylate monomer units, and from 1 to 90 parts by weight of a curing agent for epoxy resins, which is a component (C), capable of compatibilizing the mixture of the component (A), the component (B) and the component (D) at room temperature.

In a still preferable embodiment, the invention relates to a curable composition as described above, wherein the reactive silicon group in the polyoxyalkylene polymer serving as the component (B) is represented by the following general formula (1):

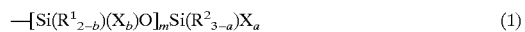

$$—[Si(R^1{}_{2-b})(X_b)O]_m Si(R^2{}_{3-a})X_a \qquad (1)$$

wherein $R^1$ and $R^2$ are the same or different and each represents an alkyl group having 1 to 20 carbon atoms, an aryl group having 6 to 20 carbon atoms, an aralkyl group having 7 to 20 carbon atoms, or a triorganosiloxy group represented by $(R')_3SiO—$, provided that when there are two or more $R^1$s or $R^2$s, they may be either the same or different (wherein R' represents a monovalent hydrocarbyl group having 1 to 20 carbon atoms and three R's may be either the same or different); X represents a hydroxyl group or a hydrolyzable group, and when there are two or more Xs, they may be either the same or different; a is 0, 1, 2 or 3 and b is 0, 1 or 2, provided that the requirement $a+\Sigma b \geq 2$ is satisfied and b's in m $—Si(R^1{}_{2-b})(X_b)—O—$ groups may be either the same or different; and m is an integer of 0 to 19.

In a still preferable embodiment, the invention relates to a curable composition as described above wherein the main chain skeleton of the polyoxyalkylene polymer serving as the component (B) comprises polyoxypropylene.

In a still preferable embodiment, the invention relates to a curable composition as described above wherein the component (D) is a copolymer having a molecular chain comprising (preferably substantially consisting of) (a) an alkyl acrylate monomer unit and/or an alkyl methacrylate monomer unit carrying an alkyl group having 1 to 8 carbon atoms, and (b) an alkyl acrylate monomer unit and/or an alkyl methacrylate monomer unit carrying an alkyl group having 10 or more carbon atoms.

In a still preferable embodiment, the invention relates to a curable composition as described above wherein the component (D) is a copolymer having a silicon-containing group which can be crosslinked by forming a siloxane bond.

In a still preferable embodiment, the invention relates to a curable composition as described above wherein the curing agent for epoxy resins serving as the component (C) is an alicyclic amine, a polyoxyalkylene amine or an epoxy-modified product of the same.

In a still preferable embodiment, the invention relates to a curable composition as described above wherein the curing agent for epoxy resins serving as the component (C) is an epoxy-modified product of isophoronediamine.

DETAILED DESCRIPTION OF THE INVENTION

Now, the invention will be described in greater detail.

As the epoxy resin which is to be used as the component (A) in the invention, use can be broadly made of publicly known ones. Examples thereof include bisphenol A type epoxy resins, bisphenol F type epoxy resins, bisphenol AD type epoxy resins, bisphenol S type epoxy resins and epoxy resins prepared by hydrogenating the same, glycidyl ester type epoxy resins, glycidylamine type epoxy resins, alicyclic epoxy resins, novolak type epoxy resins, urethane-modified epoxy resins having urethane bond, fluorinated epoxy resins, rubber-modified epoxy resins containing polybutadiene or NBR and flame-retardant epoxy resins such as glycidyl ether of tetrabromobisphenol A. Either one of these epoxy resins or a combination of two or more thereof may be used. It is particularly preferable to use a bisphenol A type resin from the viewpoints of working properties, curability, adhesive strength and the balance of the availability for adherends.

The reactive silicon group in the component (B) to be used in the invention is not particularly restricted. As typical examples thereof, groups represented by the following general formula (1) may be cited.

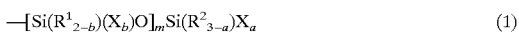

(1)

wherein $R^1$ and $R^2$ are the same or different and each represents an alkyl group having 1 to 20 carbon atoms, an aryl group having 6 to 20 carbon atoms, an aralkyl group having 7 to 20 carbon atoms, or a triorganosiloxy group represented by $(R')_3SiO—$, provided that when there are two or more $R^1$s or $R^2$s, they may be either the same or different (wherein R' represents a monovalent hydrocarbyl group having 1 to 20 carbon atoms and three R's may be either the same or different); X represents a hydroxyl group or a hydrolyzable group, and when there are two or more Xs, they may be either the same or different; a is 0, 1, 2 or 3 and b is 0, 1 or 2, provided that the requirement $a+\Sigma b \geq 2$ is satisfied and b's in m $—Si(R^1_{2-b})(X_b)—O—$ groups may be either the same or different; and m is an integer of 0 to 19.

The hydrolyzable group in the general formula (1) may be a publicly known hydrolyzable group without restriction. Particular examples thereof include hydrogen atom, halogen atom, alkoxy group, acyloxy group, ketoxymate group, amino group, amido group, acid amido group, aminooxy group, mercapto group and alkenyloxy group. Among all, an alkoxy group (for example, methoxy group, ethoxy group, propoxy group, isopropoxy group) is preferable, since such a group has a mild hydrolyzability and can be easily handled.

One to three hydroxyl groups or hydrolyzable groups can be attached to one silicon atom. Namely, it is preferable that (a+Σb) is from 2 to 5. When the silicon group carries two or more hydroxyl groups or hydrolyzable groups, they may be either the same or different from each other.

The reactive silicon group may have one or more silicon atoms. In case of a reactive silicon group wherein silicon atoms are bonded to each other via, for example, siloxane bond, it may have about 20 silicon atoms.

It is preferable to use a reactive silicon group represented by the following general formula (2), since it can be easily obtained:

$$—Si(R^2_{3-c})X_c \qquad (2)$$

wherein $R^2$ and X are each as defined above; and c is 2 or 3.

Particular examples of $R^1$ and $R^2$ in the general formula (1) include alkyl groups (for example, methyl group, ethyl group), cycloalkyl groups (for example, cyclohexyl group), aryl groups (for example, phenyl group), aralkyl groups (for example, benzyl group) and triorganosiloxy group represented by $(R')_3SiO—$ wherein R' is, for example, a methyl group or a phenyl group. It is particularly preferable that $R^1$, $R^2$ and R' are each a methyl group.

The main chain structure of the polyoxyalkylene polymer of the component (B) to be used in the invention may be a polymer having a structure represented by $—R—O—$ as the repeating unit, wherein R is a divalent organic group having 1 to 20 carbon atoms. It may be either a homopolymer consisting of a single type of repeating units or a copolymer consisting of two or more types of repeating units. Furthermore, the main chain may have a branched structure.

Particular examples of R include $—CH_2CH_2—$, $—CH(CH_3)CH_2—$, $—CH(C_2H_5)CH_2—$, $—C(CH_3)_2CH_2—$ and $—CH_2CH_2CH_2CH_2—$, $—CH(CH_3)CH_2—$ is particularly preferable as R.

The main chain skeleton of the polyoxyalkylene polymer serving as the component (B) can be obtained by, for example, the ring opening polymerization of a monoepoxide in the presence of an initiator and a catalyst.

Particular examples of the initiator include dihydric alcohols and polyhydric alcohols (for example, ethylene glycol, propylene glycol, butanediol, hexamethylene glycol, methallyl alcohol, bisphenol A, hydrogenated bisphenol A, neopentyl glycol, polybutadienediol, diethylene glycol, triethylene glycol, polyethylene glycol, polypropylene glycol, polypropylenetriol, polypropylenetetraol, dipropylene glycol, glycerol, trimethylolmethane, trimethylolpropane, pentaerythritol) and various oligomers having hydroxyl group.

Particular examples of the monoepoxide include alkylene oxides (for example, ethylene oxide, propylene oxide, α-butylene oxide, β-butylene oxide, hexene oxide, cyclohexene oxide, styrene oxide, α-methylstyrene oxide), alkyl glycidyl ethers (for example, methyl glycidyl ether, ethyl glycidyl ether, isopropyl glycidyl ether, butyl glycidyl ether) allyl glycidyl ethers and aryl glycidyl ethers.

As the catalyst, use can be made of publicly known ones such as alkali catalyst (for example, KOH, NaOH), acidic catalyst (for example, trifluoroborane etherate) and double metal cyanide complex catalysts (for example, cobalt zinc cyanide-glyme catalyst). It is particularly preferable to use a double metal cyanide complex catalyst accompanied by little side reaction, though other catalysts are also usable.

Alternatively, the main chain skeleton of the polyoxyalkylene polymer can be obtained by the chain lengthening of a hydroxyl-terminal polyoxyalkylene polymer by treating with a bifunctional or higher alkyl halide (for example, $CH_2Cl_2$, $CH_2Br_2$) in the presence of a basic compound (for example, KOH, KOCH$_3$, NaOCH$_3$). In addition, use may be made of a method of lengthening the chain of a hydroxyl-terminal polyoxyalkylene polymer with the use of a bifunctional or trifunctional isocyanate compound.

The reactive silicon group may be introduced into the polyoxyalkylene polymer by various methods without restriction. It is particularly preferable to react a polyoxyalkylene polymer having a terminal unsaturated group represented by the following general formula (3) or (4) in its molecule:

(3)

or

(4)

wherein $R^3$ represents a divalent organic group having 1 to 20 carbon atoms; and $R^4$ represents a hydrocarbyl group having not more than 10 carbon atoms; with a reactive silicon-containing group represented by the following general formula (5):

$$H\text{---}[Si(R^1_{2-b})(X_b)O]_m Si(R^2_{3-a})X_a \tag{5}$$

wherein $R^1$, X, a, b and m are each as defined above; in the presence of a group VIII transition metal catalyst.

In addition, the reactive silicon group-containing polyoxyalkylene polymer can be obtained by adding a reactive silicon group-containing isocyanate to a hydroxyl-terminal polyoxyalkylene polymer, reacting an isocyanate-terminal polyoxyalkylene polymer with a reactive silicon group-containing amine compound, or reacting an isocyanate-terminal polyoxyalkylene polymer with a reactive silicon group-containing mercaptan compound.

The polyoxyalkylene polymer having a terminal unsaturated group represented by the general formula (3) or (4) may be produced by a publicly known method. For example, it may be obtained by reacting a hydroxyl-terminal polyoxyalkylene polymer with an unsaturated group-containing compound to form, for example, ether bond, ester bond, urethane bond or carbonate bond. In case of introducing an unsaturated group via ether bond, for example, the terminal hydroxyl group of the polyoxyalkylene polymer is metal oxidized to give —OM (wherein M represents, for example, Na or K) and then reacted with an unsaturated group-containing compound represented by the following general formula (6) or (7):

$$CH_2\text{=}CH\text{---}R^3\text{---}X^2 \tag{6}$$

or $$CH_2\text{=}CH(R^4)\text{---}R^3\text{---}X^2 \tag{7}$$

wherein $R^3$ and $R^4$ are each as defined above; and $X^2$ represents a halogen atom.

Particular examples of the unsaturated group-containing compound represented by the general formula (6) or (7) include $CH_2$=CH—$CH_2$—Cl, $CH_2$=CH—$CH_2$—Br, $CH_2$=CH—$C_2H_4$—Cl, $CH_2$=CH—$C_2H_4$—Br, $CH_2$=CH—$C_3H_6$—Cl, $CH_2$=CH—$C_3H_6$—Br, $CH_2$=C($CH_3$)—$CH_2$—Cl, $CH_2$=C($CH_3$)—$CH_2$—Br, $CH_2$=C($CH_2CH_3$)—$CH_2$—Cl, $CH_2$=C($CH_2CH_3$)—$CH_2$—Br, $CH_2$=C($CH_2CH(CH_3)_2$)—$CH_2$—Cl and $CH_2$=C($CH_2CH(CH_3)_2$)—$CH_2$—Br. From the viewpoint of reactivity, $CH_2$=CH—$CH_2$—Cl and $CH_2$=C($CH_3$)—$CH_2$—Cl are particularly preferable therefor.

In addition, the unsaturated group may be introduced by using isocyanate compounds having, for example, $CH_2$=CH—$CH_2$— or $CH_2$=C($CH_3$)—$CH_2$— group, carboxylic acids or epoxy compounds.

As the group VIII transition metal catalyst, it is effective to use metal complex catalysts of metals selected from the group VIII transition metals such as platinum, rhodium, cobalt, palladium and nickel. For example, use can be made of $H_2PtCl_6 6H_2O$, platinum-vinyl siloxane complex, platinum-olefin complex, Pt metal, $RhCl(PPh_3)_3$, $RhCl_3$, $Rh/Al_2O_3$, $RuCl_3$, $IrCl_3$, $FeCl_3$, $PdCl_2.2H_2O$ or $NiCl_2$. Taking the reactivity in the hydrosilylation into consideration, it is particularly preferable to use one selected from among $H_2PtCl_6.6H_2O$, platinum-vinyl siloxane complex and platinum-olefin complex.

Such production methods are described in, for example, the specifications of Japanese Patent No. 1396791, Japanese Patent No. 1727750, Japanese Patent No. 2135751 and JP-A-3-72527.

Although the molecular weight of the polyoxyalkylene polymer is not particularly restricted, it is preferable that the number-average molecular weight thereof determined by GPC in terms of styrene is from 500 to 100,000. It is still preferable that the molecular weight falls within a range of from 1,000 to 70,000 from the viewpoint of, for example, easiness in handling.

Per 100 parts by weight of the component (A), the component (B) is employed in an amount of from 1 to 50 parts by weight, still preferably from 5 to 40 parts by weight. When the amount of the component (B) is less than 1 part by weight, only an insufficient peel strength can be established. It is not favorable that its amount exceeds 50 parts by weight, since shear strength is lowered in this case.

The curable composition according to the invention may further contain, if necessary, a copolymer (D) to improve the compatibility of the component (A) with the component (B).

As the alkyl acrylate monomer unit in the copolymer, which is the component (D) to be used in the invention, having a molecular chain comprising (preferably substantially consisting of) one or more alkyl acrylate monomer units and/or alkyl methacrylate monomer units (hereinafter referred to simply as the complex (D)), use can be broadly made of publicly known ones. Examples thereof include methyl acrylate, ethyl acrylate, n-propyl acrylate, n-butyl acrylate, isobutyl acrylate, tert-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, behenyl acrylate and biphenyl acrylate. As the alkyl methacrylate monomer unit, use can be broadly made of publicly known ones too. Examples thereof include methyl methacrylate, ethyl methacrylate, n-propyl methacrylate, n-butyl methacrylate, isobutyl methacrylate, tert-butyl methacrylate, n-hexyl methacrylate, 2-ethylhexyl methacrylate, decyl methacrylate, undecyl methacrylate, lauryl methacrylate, tridecyl methacrylate, myristyl methacrylate, cetyl methacrylate, stearyl methacrylate, behenyl methacrylate and biphenyl methacrylate.

The molecular chain of the copolymer (D) substantially consists of one or more alkyl acrylate monomer units and/or alkyl methacrylate monomer units. The expression "substantially consists of these monomer units" as used herein means that the content of the alkyl acrylate monomer units and/or alkyl methacrylate monomer units in the copolymer (D) exceeds 50%, preferably 70% or more, based on the total monomer units of (D).

Among the combinations of these monomers, it is preferable from the viewpoints of compatibility and stability that the molecular chain substantially consists of (a) an alkyl acrylate monomer unit and/or an alkyl methacrylate monomer unit carrying an alkyl group having 1 to 8 carbon atoms, and (b) an alkyl acrylate monomer unit and/or an alkyl methacrylate monomer unit carrying an alkyl group having 10 or more carbon atoms. Such a copolymer will be referred to as a copolymer (D)-a hereinafter. The alkyl acrylate monomer unit and/or the alkyl methacrylate monomer unit carrying an alkyl group having 1 to 8 carbon atoms (i.e., the monomer unit (a)) in this copolymer is represented by the following general formula (8):

$$CH_2\text{=}C(R^5)COOR^6 \tag{8}$$

wherein $R^5$ represents a hydrogen atom or a methyl group; and $R^6$ represents an alkyl group having 1 to 8 carbon atoms.

Examples of $R^6$ in the general formula (6) include alkyl groups having 1 to 8, preferably 1 to 4 and still preferably 1 or 2, carbon atoms such as methyl group, ethyl group, propyl group, n-butyl group, t-butyl group and 2-ethylhexyl group. Either one or more of the monomers represented by the general formula (8) may be employed.

The alkyl acrylate monomer unit and/or the alkyl methacrylate monomer unit carrying an alkyl group having 10 or more carbon atoms (i.e., the monomer unit (b)) is represented by the following general formula (9):

$$CH_2=C(R^5)COOR^7 \qquad (9)$$

wherein $R^5$ is as defined above; and $R^7$ represents an alkyl group having 10 or more carbon atoms.

Examples of $R^7$ in the general formula (9) include long-chain alkyl groups having 10 or more, usually from 10 to 30 and preferably from 10 to 20 carbon atoms, such as lauryl group, tridecyl group, cetyl group, stearyl group, $C_{22}$ alkyl groups and biphenyl group. One of the monomers represented by the general formula (9) may be used. Alternatively, a mixture of two or more thereof (for example, a $C_{12}$ monomer with a $C_{13}$ monomer) may be employed.

The molecular chain of a in the copolymer (D) substantially consists of the monomer units (a) and (b). The expression "substantially consists of the monomer units (a) and (b)" as used herein means that the content of the monomer units (a) and (b) in the copolymer (D) exceeds 50%, preferably 70% or more. When the content of the monomer units (a) and (b) is less than 50%, the compatibility of a in the polyoxyalkylene polymer (B) and the copolymer (D) is lowered and thus there arises clouding. In this case, the adhesive properties are liable to be worsened too.

The weight ratio of the monomer unit (a) to the monomer unit (b) preferably ranges from 95:5 to 40:60, still preferably form 90:10 to 60:40, in view of compatibility and economical efficiency.

In addition to the alkyl acrylate monomer unit and/or the alkyl methacrylate monomer unit, the copolymer (D) may contain monomer unit(s) copolymerizable therewith. Examples of these monomer units include acrylic acid monomer units (for example, acrylic acid, methacrylic acid), amido-containing monomer units (for example, acrylamide, methacrylamide, N-methylolacrylamide, N-methylolmethacrylamide), epoxy-containing monomer units (for example, glycidyl acrylate, glycidyl methacrylate), amino-containing monomer units (for example, diethylaminoethyl acrylate, diethylaminoethyl methacrylate, aminoethyl vinyl ether), and monomer units derived from, for example, acrylonitrile, styrene, α-methylstyrene, alkyl vinyl ethers, vinyl chloride, vinyl acetate, vinyl propionate and ethylene.

Although the molecular weight of the copolymer of the component (D) is not particularly restricted, it is preferable the number-average molecular weight thereof determined by GPC in terms of styrene is from 500 to 100,000. It is still preferable that the molecular weight falls within a range of from 1,000 to 10,000 form the viewpoint of, for example, easiness in handling.

The copolymer (D) can be obtained by the conventional vinyl polymerization methods. For example, it can be obtained by the solution polymerization by radical reaction or block polymerization, though the invention is not restricted thereto. The reaction is carried out usually by adding the above-described monomers, a radical initiator, a chain transfer agent and a solvent at 50 to 150° C.

Examples of the radical initiator include azobisisobutyronitrile and benzoyl peroxide. Examples of the chain transfer agent include mercaptans (for example, n-dodecyl mercaptan, t-dodecyl mercaptan, lauryl mercaptan) and halogenated compounds. As the solvent, it is preferable to use non-reactive solvents such as ethers, hydrocarbons and esters.

From the viewpoint of the final adhesive strength, it is preferable that the copolymer (D) contains a silicon-containing group which can be crosslinked by forming a siloxane bond (hereinafter referred to as a reactive silicon group).

The reactive silicon group may be introduced into the copolymer (D) by various methods, for example, (I) a method of polymerizing a compound having a polymerizable unsaturated bond and a reactive silicon group with the monomers (a) and (b); (II) a method of copolymerizing a compound having a polymerizable unsaturated bond and a reactive functional group (hereinafter referred to as the Y group) such as acrylic acid with the monomers (a) and (b) and then reacting the thus obtained copolymer with a compound having a reactive silicon group and a functional group capable of reacting with the Y group (hereinafter referred to as the Y' group) such as a compound having an isocyanate group and an —Si(OCH$_3$)$_3$ group; (III) a method of copolymerizing the monomers (a) and (b) in the presence of a reactive silicon group-containing mercaptan as a chain transfer agent; (IV) a method of copolymerizing the monomer units (a) and (b) with the use of a reactive silicon group-containing azobisnitrile compound or disulfide compound as an initiator; and (V) a method of polymerizing the monomer units (a) and (b) by the living radical polymerization method and then introducing a reactive silicon group into the terminus of the molecule, though the invention is not restricted thereto. It is also possible to arbitrarily combine the methods (I) to (V). For example, it is possible to copolymerize the monomers (a) and (b) together with a compound having a polymerizable unsaturated bond and a reactive silicon group in the presence of a reactive silicon group-containing mercaptan as a chain transfer agent, i.e., the combination of the methods (I) and (III).

The compound having a polymerizable unsaturated bond and a reactive silicon group as described in (I) is represented by the following general formula (10):

$$CH_2=C(R^5)COOR^8-[Si(R^1{}_{2-b})(X_b)O]_mSi(R^2{}_{3-a})X_a \qquad (10)$$

wherein $R^5$ is as defined above; $R^8$ represents a divalent alkylene group having 1 to 6 carbon atoms; and $R^1$, $R^2$, X, a, b and m are each as defined above; or the following general formula (11):

$$CH_2=C(R^5)-[Si(R^1{}_{2-b})(X_b)O]_mSi(R^2{}_{3-a})X_a \qquad (11)$$

wherein $R^1$, $R^2$, $R^5$, X, a, b and m are each as defined above;

Examples of $R^8$ in the general formula (10) include alkyelne groups having 1 to 6, preferably 1 to 4, carbon atoms such as methylene group, ethylene group and propylene group.

Examples of the compound having a polymerizable unsaturated bond and a reactive silicon group represented by the following general formula (10) or (11) include γ-methacryloxyalkyl polyalkoxy silanes (for example, γ-methacryloxypropyl trimethoxy silane, γ-methacryloxypropylmethyl dimethoxy silane, γ-methacryloxypropyl triethoxy silane), γ-acryloxypropylalkyl polyalkoxy silanes (for example, γ-acryloxypropyl trimethoxy silane, γ-acryloxypropylmethyl dimethoxy silane, γ-acryloxypropyl triethoxy silane) and vinylalkyl polyalkoxy silanes (for example, vinyl trimethoxy silane, vinylmethyl dimethoxy silane, vinyl triethoxy silane). Either one of these compounds or a mixture of two or more thereof may be used.

Various combinations may be cited as the example of the Y and Y' groups as described in (II). For example, the Y group is exemplified by amino group, hydroxyl group and carbonate group, while the Y' group is exemplified by isocyanate group. As another example, an allyl group and a silicon hydride (H—Si) group may be used respectively as the Y and Y' groups, as stated in JP-A-54-36395, JP-A-1-272654 and JP-A-2-214759. In this case, the Y and Y' groups can be bonded to each other by the hydrosilylation reaction in the presence of a group VIII transition metal.

Examples of the reactive silicon group-containing mercaptan to be used as the chain transfer agent as described in (III) include γ-mercaptopropyl trimethoxy silane, γ-mercaptopropylmethyl dimethoxy silane and γ-mercaptopropyl triethoxy silane. As stated in JP-A-59-78222, it is also possible to copolymerize the monomers (a) and (b) in the presence of a bifunctional radical-polymerizable compound and a mercaptan having an alkoxysilyl group employed as a chain transfer agent.

Examples of the reactive silicon group-containing azo-bisnitrile compound and disulfide compound as described in (IV) include the alkoxysilyl group-containing azobisnitrile compounds and alkoxysilyl group-containing disulfide compounds described in, for example, JP-A-60-23405 and JP-A-62-70405.

As an example of the method (V), citation may be made of the method stated in JP-A-9-272714.

Moreover, it is also possible to employ a method of using a reactive silicon group-containing mercaptan together with a reactive silicon group-containing radical polymerization initiator, as stated in, for example, JP-A-59-168014 and JP-A-60-228516.

It is preferable from the viewpoints of the effect on the adhesive force and cost that the copolymer (D) contains from 0.1 to 2.0, still preferably from 0.5 to 1.5, of the reactive silicon group per molecule on average, though the invention is not restricted thereto.

Per 100 parts by weight of the component (A), the component (D) is employed in an amount of from 1 to 50 parts by weight, still preferably from 5 to 40 parts by weight. When the amount of the component (D) is less than 1 part by weight, only an insufficient peel strength can be established. It is not favorable that its amount exceeds 50 parts by weight, since shear strength is lowered in this case.

As the curing agent for epoxy resins to be used as the component (C) in the invention, use may be broadly made of publicly known ones. Examples thereof include aliphatic amines (for example, diethylaminopropylamine, hexamethylenediamine, methylpentamethylenediamine, trimethylhexamethylenediamine, guanidine, oleylamine); alicyclic amines (for example, menthenediamine, isophoronediamine, norbornanediamine, piperidine, N,N'-dimethylpiperazine, 1,2-diaminocyclohexane, bis(4-amino-3-methylcyclohexyl)methane, bis(4-aminocyclohexyl)methane, polycyclohexylpolyamine, 1,8-diazabicyclo[5.4.0]undecene-7 (DBU)); amines having ether bond (for example, 3,9-bis(3-aminopropyl)-2,4,6,10-tetraoxaspiro[5,5]undecane (ATU), morpholine, N-methyl morpholine, polyoxypropylenediamine, polyoxypropylenetriamine, polyoxyethylenediamine); hydroxyl group-containing amines (for example, diethanolamine, triethanolamine); acid anhydrides (for example, tetrahydrophthalic anhydride, methyltetrahydrophthalic anhydride, methylnadic anhydride, hexahydrophthalic anhydride, dodecylsuccinic anhydride); polyamidoamines obtained by reacting a dimer acid with a polyamine such as diethylenetriamine or triethylenetetramine, and polyamides with the use of polycarboxylic acids other than dimer acids; imidazoles (for example, 2-ethyl-4-methyl imidazole); dicanamide; and modified amines such as epoxy-modified amines obtained by reacting these amines with epoxy compounds, Mannich-modified amines obtained by reacting these amines with formalin or phenols, Michael addition modified amines and ketimine. Either one of these curing agents or a mixture of two or more thereof may be used.

Per 100 parts by weight of the component (A), the component (C) is employed in an amount of from 1 to 90 parts by weight, still preferably from 5 to 80 parts by weight. When the amount of the component (C) is less than 1 part by weight, the epoxy resin cannot be sufficiently cured and thus the adhesion strength is lowered. It is not favorable that its amount exceeds 90 parts by weight, since there arises bleeding into the interface and thus the adhesive properties are worsened in this case.

Taking the balance of the physical properties into consideration, it is preferable to use a curing agent for epoxy resins capable of compatibilizing a mixture of the component (A), the component (B) and the component (D) at room temperature prior to curing. Among all, it is preferable to use an alicyclic amine, a polyoxyalkylene-type amine or an epoxy-modified derivative thereof. Examples of the epoxy compounds to be used in the epoxy-modification include bisphenol A type epoxy resins, ethylene oxide, propylene oxide, phenyl glycidyl ether and higher alcohol glycidyl ethers.

It is still preferable to use an alicyclic amine or an epoxy-modified derivative thereof. It is still preferable to use an epoxy-modified derivative of an alicyclic amine. Among all, epoxy-modified isophoronediamine is particularly desirable.

The curable composition according to the invention may further contain, for example, a reactive diluent, a condensation catalyst, a silane coupling agent, a filler, a thixotropic agent, a plasticizer, a colorant and a stabilizer, if necessary.

Examples of the reactive diluent include monofunctional epoxy compounds (for example, n-butyl glycidyl ether, allyl glycidyl ether, 2-ethylhexyl glycidyl ether, dodecyl glycidyl ether, tridecyl glycidyl ether, phenyl glycidyl ether, cresyl glycidyl ether, p-sec-butylphenyl glycidyl ether, glycidyl methacrylate, tertiary carboxylic acid glycidyl esters); bifunctional epoxy compounds (for example, diglycidyl ether, ethylene glycol diglycidyl ether, 1,4-butanediol diglycidyl ether, 1,6-hexanediol diglycidyl ether, (poly)ethylene glycol diglycidyl ether, (poly)propylene glycol diglycidyl ether, diglycidyl aniline, hydrogenated bisphenol A diglycidyl ether); and trifunctional epoxy compounds (for example, trimethylolpropane triglycidyl ether, glycerol triglycidyl ether). In the invention, either one of these epoxy compounds or a mixture of two or more thereof may be used. The epoxy compound is employed usually in an amount of form 1 to 70 parts by weight, preferably form 5 to 50 parts by weight, per 100 parts by weight of the component (A).

As the condensation catalyst, use can be broadly made of publicly known ones. Examples thereof include publicly known silanol condensation catalysts such as titanic acid esters (for example, tetrabutyl titanate, tetrapropyl titanate); organotin compounds (for example, dibutyltin dilaurate, dibutyltin maleate, dibutyltin diacetate, tin octylate, tin naphthate, the product obtained by reacting dibutyltin oxide with phthalic acid ester, dibutyltin bisacetylacetonate); organic aluminum compounds (for example, aluminum trisacetylacetonate, aluminum trisethylacetate, diisopropoxyaluminum ethylacetoacetate); chelate compounds (for example, zirconium tetraacetylacetonate, titanium tetraacetylacetonate); organic iron compounds (for example, iron naphthate, iron octylate); lead octylate; amine compounds (for example, butylamine, octylamine, dibutylamine, laurylamine) or salts of these amine compounds with carboxylic acids; acidic phosphoric acid esters; products obtained by reacting acidic phosphoric acid esters with amines; saturated or unsaturated polyhydric carboxylic acids or acid anhydrides thereof; low-molecular weight polyamidoamines obtained by reacting polyamines in excess with polybasic acids; and products obtained by reacting polyamines in excess with epoxy compounds; amino group-containing silane coupling agents (for example, γ-aminopropyl trimethoxy silane, N-(β-aminoethyl) aminopropylmethyl dimethoxy silane); other acidic catalysts and basic catalysts. Either one of these catalysts or a mixture of two or more thereof may be used. It is preferable that the condensation catalyst is used in an amount of usually form about 0.01 to 10 parts by weight, preferably from about 0.1 to 5 parts by weight, per 100 parts by weight of the component (B) and/or the component (D).

Examples of the silane coupling agent include amino group-containing silanes (for example, γ-aminopropyl trimethoxy silane, γ-aminopropyl dimethoxy silane, γ-(2-aminoethyl)aminopropyl trimethoxy silane, γ-(2-aminoethyl)aminopropylmethyl dimethoxy silane, γ-(2-aminoethyl)aminopropyl triethoxy silane, γ-ureidopropyl triethoxy silane, N-β-(N-vinylbenzylaminoethyl)-γ-aminopropyl trimethoxy silane, γ-anilinopropyl trimethoxy silane); mercapto group-containing silanes (for example, γ-mercaptopropyl trimethoxy silane, γ-mercaptopropyl triethoxy silane, γ-mercaptopropylmethyyl dimethoxy silane, γ-mercaptopropylmethyl diethoxy silane); epoxy group-containing silanes (for example, γ-glycidoxypropyl trimethoxy silane, γ-glycidoxypropylmethyl dimethoxy silane, γ-glycidoxypropyl triethoxy silane, β-(3,4-epoxycyclohexyl)ethyl trimethoxy silane); carboxy silanes (for example, β-carboxylethylphenyl bis(2-methoxyethoxy) silane, N-β-(N-carboxylmethylaminoethyl)-γ-aminopropyl trimethoxy silane); ketiminized silanes obtained by the dehydrocondensation of amino group-containing silanes with various ketones; products obtained by reacting amino group-containing silanes with epoxy group-containing silanes; products obtained by reacting mercapto group-containing silanes with epoxy group-containing silanes; products obtained by reacting amino group-containing silanes with epoxy resins; and products obtained by reacting mercapto group-containing silanes with epoxy resins. Either one of these silicon compounds or a mixture of two or more thereof may be used in the invention. It is preferable that the silicon compound is used in an amount of usually from about 0.001 to 20 parts by weight, preferably form about 0.01 to 10 parts by weight, per 100 parts by weight of the component (A).

Examples of the filler include reinforcing fillers (for example, fumed silica, precipitated silica, silicic anhydride, carbon black); fillers (for example, calcium carbonate, magnesium carbonate, diatomaceous earth, baked clay, clay, talc, titanium oxide, bentonite, organic bentonite, kaolin, ferric oxide, zinc oxide, active zinc white, hydrogenated castor oil, Shirasu balloon); and fibrous fillers (for example, asbestos, glass fiber, filament). Either one of these fillers or a mixture of two or more thereof may be used.

The curable composition according to the invention may further contain water to accelerate the curing, if necessary.

The curable composition according to the invention may be cured by heating. Alternatively, it can be cured by allowing to stand at room temperature.

EXAMPLES

Now, the invention will be illustrated in greater detail by reference to the following Examples. However, it is to be understood that the invention is not construed as being limited thereto.

Synthesis Example 1

800 g of polyoxypropylene (average molecular weight: 8,000) having allyl ether group introduced into the molecular terminus was fed into a pressure reactor provided with a stirrer and 1.1 (eq/vinyl group) of methyl dimethoxy silane was added thereto. Next, $1 \times 10^{-4}$ (eq/vinyl group) of a platinic chloride catalyst (platinic chloride hexahydrate) was added thereto and the resultant mixture was reacted at 90° C. for 2 hours. By $^1$H-NMR, it was confirmed that the terminal functionalization ratio was 82% (Polymer A).

Synthesis Example 2

Into 43 g of toluene heated to 110° C. was dropped over 4 hours a solution prepared by dissolving 2.6 g of azobisisobutyronitrile employed as a polymerization initiator in a mixture of 6.0 g of butyl acrylate, 66 g of methyl methacrylate, 13 g of stearyl methacrylate, 5.4 g of γ-methacryloxypropylmethyl dimethoxy silane, 7.0 g of γ-mercaptopropylmethyl dimethoxy silane and 23 g of toluene. After performing polymerization for 2 hours, a copolymer having a solid concentration of 60% and a number-average molecular weight (Mn) determined by GPC in terms of styrene of 2,200 was obtained.

Polymer A obtained in Synthesis Example 1 and this copolymer were blended together at a solid ratio (by weight) of 60/40 and evaporated by heating to 110° C. under reduced pressure in an evaporator. Thus a transparent and viscous liquid having a solid concentration of 99% or more was obtained (Polymer B).

Example 1

A composition was prepared by adding, to 60 parts by weight of Epikote 828 (bisphenol A type epoxy resin, manufactured by Yuka Shell Epoxy Kabushikikaisha), 40 parts by weight of Fuji-Cure 4200 (modified alicyclic amine, manufactured by Fuji Kasei Kogyo Co., Ltd.) employed as a curing agent for epoxy resins, 20 parts by weight of Polymer A, 0.2 parts by weight of No. 918 (tin catalyst, manufactured by Sankyo Yuki Gosei), 0.4 parts by weight of A-112 (N-β-aminoethyl (γ-aminopropyl) trimethoxy silane, manufactured by Nippon Unicar Co., Ltd.) and 0.1 part by weight of water. Immediately after the completion of the preparation, the compatibilized conditions were observed at room temperature. Then tensile shear and T-peeling test pieces were prepared and a tensile test was carried out after aging.

Example 2

The same composition as in Example 1 was employed but using 70 parts by weight of Epikote 828 and 30 parts by weight of Fuji-Cure 4233 (modified alicyclic amine, manufactured by Fuji Kasei Kogyo Co., Ltd.) as a curing agent for epoxy resins and evaluation was carried out.

Example 3

Use was made of a composition of 48 parts by weight of Epikote 828, 32 parts by weight of Fuji-Cure 4200, 20 parts by weight of Polymer A, 0.2 parts by weight of No. 918, 0.2 parts by weight of A-1122 and 0.1 part by weight of water and evaluation was carried out.

Example 4

The same composition as in Example 3 was employed but adding 20 parts by weight of Epolite 1600 (1,6-hexanediol diglycidyl ether, manufactured by Kyoeisha Kagaku) as a reactive diluent and evaluation was carried out.

Example 5

Use was made of a composition of 54 parts by weight of Epikote 828, 36 parts by weight of Fuji-Cure 4200, 10 parts by weight of Polymer A, 0.1 part by weight of No. 918, 0.1 part by weight of A-1122 and 0.5 parts by weight of water and evaluation was carried out.

Example 6

The same composition as in Example 5 was employed but adding 20 parts by weight of Epolite 1600 as a reactive diluent and evaluation was carried out.

Example 7

The same composition as in Example 5 was employed but adding 10 parts by weight of Epolite M-1230 (C12, C13 mixed higher alcohol diglycidyl ether, manufactured by Kyoeisha Kagaku) as a reactive diluent and evaluation was carried out.

Example 8

The same composition as in Example 1 was employed but using Polymer B as the polymer and evaluation was carried out.

Comparative Example 1

A composition was prepared by adding, to 42 parts by weight of Epikote 828, 28 parts by weight of Fuji-Cure 4200, 30 parts by weight of Polymer A, 0.3 parts by weight of No. 918, 0.3 parts by weight of A-112 and 0.15 parts by weight of water. Then evaluation was carried out.

Comparative Example 2

A composition was prepared by adding, to 24 parts by weight of Epikote 828, 16 parts by weight of Fuji-Cure 4200, 60 parts by weight of Polymer A, 0.6 parts by weight of No. 918, 0.6 parts by weight of A-112 and 0.3 parts by weight of water. Then evaluation was carried out.

Comparative Example 3

By using 60 parts by weight of Epikote 828 and 40 parts of Fuji-Cure 4200, evaluation was carried out.

Comparative Example 4

The same composition as Comparative Example 3 was used but adding 0.2 parts by weight of A-1122 and evaluation was carried out.

Comparative Example 5

The same composition as Comparative Example 3 was used but adding 20 parts by weight of Epolite 1600 and evaluation was carried out.

Comparative Example 6

The same composition as Example 2 was used but employing Fuji-Cure 5100 (modified aromatic amine, manufactured by Fuji Kasei Kogyo Co., Ltd.) as the curing agent for epoxy resins and evaluation was carried out.

Comparative Example 7

A composition was prepared by adding, to 72 parts by weight of Epikote 828, 8 parts by weight of 2,4,6-tris (dimethylaminomethyl)phenol (TAP, manufactured by Kayaku Akzo) as a curing agent for epoxy resins, 20 parts by weight of Polymer A, 0.2 parts by weight of No. 918, 0.2 parts by weight of A-112 and 0.1 part by weight of water. Then evaluation was carried out.

The evaluation was made on the following items.

Evaluation of compatibility:

A sample composition was stirred and defoamed by centrifuging (3,000 rpm×1 min). Then the compatibilized conditions were judged with the naked eye (23° C.).

Tensile shear strength:

Sand-blasted steel plates (100×25×1.6 mm) were bonded together at a length of 12.5 mm and aged (23° C. for 2 days+50° C. for 3 days, or 23° C. for 7 days). Then a test was carried out at a tensile speed of 50 mm/min.

T-peeling strength:

Sand-blasted steel plates (200×25×0.1 mm) were employed and aged (23° C. for 2 days+50° C. for 3 days, or 23° C. for 7 days). Then a test was carried out at a tensile speed of 50 mm/min.

Table 1 summarizes the results.

TABLE 1

| | Example | | | | | | | | Comparative Example | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Epikote 828 | 60 | 70 | 48 | 48 | 54 | 54 | 54 | 60 | 42 | 24 | 60 | 60 | 60 | 70 | 72 |
| Polymer A | 20 | 20 | 20 | 20 | 10 | 10 | 10 | | 30 | 60 | | | | 20 | 20 |
| Polymer B | | | | | | | | 20 | | | | | | | |
| Fuji-Cure 4200 | 40 | | 32 | 32 | 36 | 36 | 36 | 40 | 28 | 16 | 40 | 40 | 40 | | |
| Fuji-Cure 4233 | | 30 | | | | | | | | | | | | | |
| Fuji-Cure 5100 | | | | | | | | | | | | | | 30 | |
| TAP | | | | | | | | | | | | | | | 8 |
| Epolite 1600 | | | | 20 | | 20 | | | | | | | 20 | | |
| Epolite M-1230 | | | | | | | 10 | | | | | | | | |
| No. 918 | 0.2 | 0.2 | 0.2 | 0.2 | 0.1 | 0.1 | 0.1 | 0.2 | 0.3 | 0.6 | | | | 0.2 | 0.2 |
| A-1122 | 0.4 | 0.4 | 0.2 | 0.2 | 0.1 | 0.1 | 0.1 | 0.4 | 0.3 | 0.6 | | 0.2 | | 0.4 | 0.2 |
| Water | 0.1 | 0.1 | 0.1 | 0.1 | 0.05 | 0.05 | 0.05 | 0.1 | 0.15 | 0.3 | | | | 0.1 | 0.1 |
| Compatibility | ○ | ○ | ○ | ○ | ○ | ○ | ○ | ○ | ○ | ○ | ○ | ○ | ○ | X | X |

TABLE 1-continued

|  | Example | | | | | | | | Comparative Example | | | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 | 7 |
| A |  |  |  |  |  |  |  |  |  |  |  |  |  |  |  |
| Shear strength | 22.7 | 21.1 | 19.8 | 17.1 | 24.4 | 22.9 | 21.7 | 20.5 | 8.9 | 4.9 | 10.4 | 18.3 | 11.1 | 17.9 | 15.5 |
| Peel strength | 59.8 | 35.5 | 84.8 | 63.1 | 86.1 | 63.3 | 59.1 | 50.9 | 44.4 | 62.8 | 15.0 | 10.3 | 6.0 | 8.5 | 23.5 |
| B |  |  |  |  |  |  |  |  |  |  |  |  |  |  |  |
| Shear strength | — | — | — | 15.0 | — | 20.1 | — | — | — | — | — | — | 8.5 | — | — |
| Peel strength | — | — | — | 58.3 | — | 60.5 | — | — | — | — | — | — | 7.5 | — | — |

Compatibility: o: uniform and transparent. X: cloudy.
A: 23° C. for 2 days + 50° C. for 3 days. B: 23° C. for 7 days.
Shear strength: expressed in MPa. Peel strength: expressed in MPa/25 mm.

All of the samples of Examples showed compatibilized systems, high shear strength and favorable peel strength. On the other hand, some of the samples of Comparative Examples showed high shear strength but insufficient peel strength due to poor compatibility while others showed high compatibility but decreases in peel strength and shear strength. The samples of Examples achieved sufficient adhesive properties even without heating.

Use of the curable composition according to the invention makes it possible to improve the working properties at room temperature, compared with the existing rubber-modified epoxy resins, and achieve excellent shear strength and peel strength after curing. The composition is sufficiently curable even at a relatively low temperature and achieves excellent shear strength and peel strength.

While the invention has been described in detail and with reference to specific embodiments thereof, it will be apparent to one skilled in the art that various changes and modifications can be made therein without departing from the spirit and scope thereof.

This application is based on Japanese patent application No. 2000-113142 filed on Apr. 14, 2000 and Japanese patent application No. 2000-273303 filed on Sep. 8, 2000, the entire contents of which are incorporated hereinto by reference.

What is claimed is:

1. A curable composition comprising:
   (A) 100 parts by weight of an epoxy resin;
   (B) from 1 to 50 parts by weight of a reactive silicon group-containing polyoxyalkylene polymer; and
   (C) from 1 to 90 parts by weight of a curing agent for epoxy resins capable of compatibilizing the mixture of the component (A) and the component (B) at room temperature.

2. The curable composition according to claim 1, wherein the reactive silicon group in said polyoxyalkylene polymer (B) is represented by the following general formula (1):

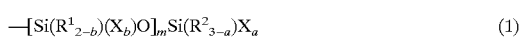
$$-[Si(R^1_{2-b})(X_b)O]_m Si(R^2_{3-a}) X_a \qquad (1)$$

wherein $R^1$ and $R^2$ are the same or different and each represents an alkyl group having 1 to 20 carbon atoms, an aryl group having 6 to 20 carbon atoms, an aralkyl group having 7 to 20 carbon atoms, or a triorganosiloxy group represented by (R')$_3$SiO— (wherein R' represents a monovalent hydrocarbyl group having 1 to 20 carbon atoms and three R's may be either the same or different), provided that when there are two or more $R^1$s or $R^2$s, they may be either the same or different; X represents a hydroxyl group or a hydrolyzable group, provided that when there are two or more Xs, they may be either the same or different; a is 0, 1, 2 or 3 and b is 0, 1 or 2, provided that the requirement a+Σb≧2 is satisfied and b's in [Si(R$^1_{2-b}$)(X$_b$)O]$_m$ groups may be either the same or different; and m is an integer of 0 to 19.

3. The curable composition according to claim 1, wherein a main chain skeleton of said polyoxyalkylene polymer (B) comprises polyoxypropylene.

4. The curable composition according to claim 1, wherein said curing agent for epoxy resins (C) is selected from the group consisting of an alicyclic amine, a polyoxyalkylene amine, an epoxy-modified product of the alicyclic amine, and an epoxy-modified product of the polyoxyalkylene amine.

5. The curable composition according to claim 1, wherein said curing agent for epoxy resins (C) is an epoxy-modified product of isophoronediamine.

6. A curable composition comprising:
   (A) 100 parts by weight of an epoxy resin;
   (B) from 1 to 50 parts by weight of a reactive silicon group-containing polyoxyalkylene polymer;
   (C) from 1 to 90 parts by weight of a curing agent for epoxy resins capable of compatibilizing the mixture of the component (A), the component (B) and the component (D) at room temperature, and;
   (D) from 1 to 50 parts by weight of a copolymer having a molecular chain comprising alkyl acrylate monomer unit and/or alkyl methacrylate monomer units.

7. The curable composition according to claim 6, wherein the reactive silicon group in said polyoxyalkylene polymer (B) is represented by the following general formula (1):

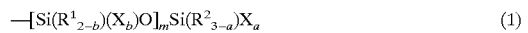
$$-[Si(R^1_{2-b})(X_b)O]_m Si(R^2_{3-a}) X_a \qquad (1)$$

wherein $R^1$ and $R^2$ are the same or different and each represents an alkyl group having 1 to 20 carbon atoms, an aryl group having 6 to 20 carbon atoms, an aralkyl group having 7 to 20 carbon atoms, or a triorganosiloxy group represented by (R')$_3$SiO— (wherein R' represents a monovalent hydrocarbyl group having 1 to 20 carbon atoms and three R's may be either the same or different), provided that when there are two or more $R^1$s or $R^2$s, they may be either the same or different; X represents a hydroxyl group or a hydrolyzable group, provided that when there are two or more Xs, they may be either the same or different; a is 0, 1, 2 or 3 and b is 0, 1 or 2, provided that the requirement $a+\Sigma b \geq 2$ is satisfied and b's in m —Si($R^1_{2-b}$)($X_b$)—O— groups may be either the same or different; and m is an integer of 0 to 19.

8. The curable composition according to claim 6, wherein a skeleton of a main chain of said polyoxyalkylene polymer (B) comprises polyoxypropylene.

9. The curable composition according to claim 6, wherein said component (D) is a copolymer having a molecular chain comprising (a) an alkyl acrylate monomer unit and/or an alkyl methacrylate monomer unit carrying an alkyl group having 1 to 8 carbon atoms, and (b) an alkyl acrylate monomer unit and/or an alkyl methacrylate monomer unit carrying an alkyl group having 10 or more carbon atoms.

10. The curable composition according to claim 6, wherein said the component (D) is a copolymer comprising a silicon-containing group which can be crosslinked by forming a siloxane bond.

11. The curable composition according to claim 6, wherein said curing agent for epoxy reins (C) is the one member selected from the group consisting of an alicyclic amine, a polyoxyalkylene amine, an epoxy-modified product of the alicyclic amine, and an epoxy-modified product of the polyoxyalkylene amine.

12. The curable composition according to claim 6, wherein said curing agent for epoxy resins (C) is an epoxy-modified product of isophoronediamine.

13. The curable composition according to claim 1, wherein said curing agent for epoxy resins (C) is the one member selected from the group consisting of an epoxy modified product of an alicyclic amine, a polyoxyalkylene amine, an epoxy-modified product of the polyoxyalkylene amine.

14. The curable composition according to claim 6, wherein said curing agent for epoxy resins (C) is the one member selected from the group consisting of an epoxy modified product of an alicyclic amine, a polyoxyalkylene amine, an epoxy-modified product of the polyoxyalkylene amine.

* * * * *